United States Patent [19]

Young et al.

[11] Patent Number: 4,897,721
[45] Date of Patent: Jan. 30, 1990

[54] AUTOMATED TESTING APPARATUS FOR SCREEN ALIGNMENT

[75] Inventors: Stephen J. Young, Milpitas, Calif.; Mike K. Blackwell, Pittsburgh, Pa.; Kevin J. Dowling, Pittsburgh, Pa.; Hans P. Moravec, Pittsburgh, Pa.; Lada Zajicek, Fremont, Calif.

[73] Assignee: Apple Computer, Cupertino, Calif.

[21] Appl. No.: 194,497

[22] Filed: May 16, 1988

[51] Int. Cl.⁴ .............................................. H04N 17/00
[52] U.S. Cl. ...................................... 358/139; 358/10
[58] Field of Search ................. 358/139, 10, 245, 255, 358/903; 340/707; 364/559; 324/121 R, 404; 315/377, 372, 386

[56]  References Cited

U.S. PATENT DOCUMENTS

| | | | |
|---|---|---|---|
| 3,962,772 | 6/1976 | Ciciora | 358/10 |
| 3,995,269 | 11/1976 | Schumacher | 315/377 X |
| 4,415,921 | 11/1983 | Mulvaney et al. | 358/139 |
| 4,439,735 | 3/1984 | Alvite et al. | 358/10 X |
| 4,485,394 | 11/1984 | Maghami et al. | 358/139 |
| 4,593,308 | 6/1986 | Kemplin | 358/139 X |
| 4,607,288 | 8/1986 | Freyberger | 358/10 X |
| 4,649,324 | 3/1987 | Guerra et al. | 358/10 X |
| 4,677,340 | 6/1987 | Miller et al. | 324/404 X |
| 4,700,218 | 10/1987 | Thomsen et al. | 358/10 X |
| 4,706,108 | 11/1987 | Kumagai et al. | 358/10 |
| 4,760,447 | 7/1988 | Koka et al. | 358/10 X |

*Primary Examiner*—James J. Groody
*Assistant Examiner*—Victor R. Kostak

[57] ABSTRACT

The present invention is an automated testing apparatus and process for screen alignment involving a pattern generator, sensors, and an analysis computer. Two sets of patterns are displayed on the screen being tested. Sensors are used to observe patterns on the screen. An analysis computer receives the data from these observations and then compares the observed data to data from an ideal screen to determine the screen's alignment parameters.

18 Claims, 4 Drawing Sheets

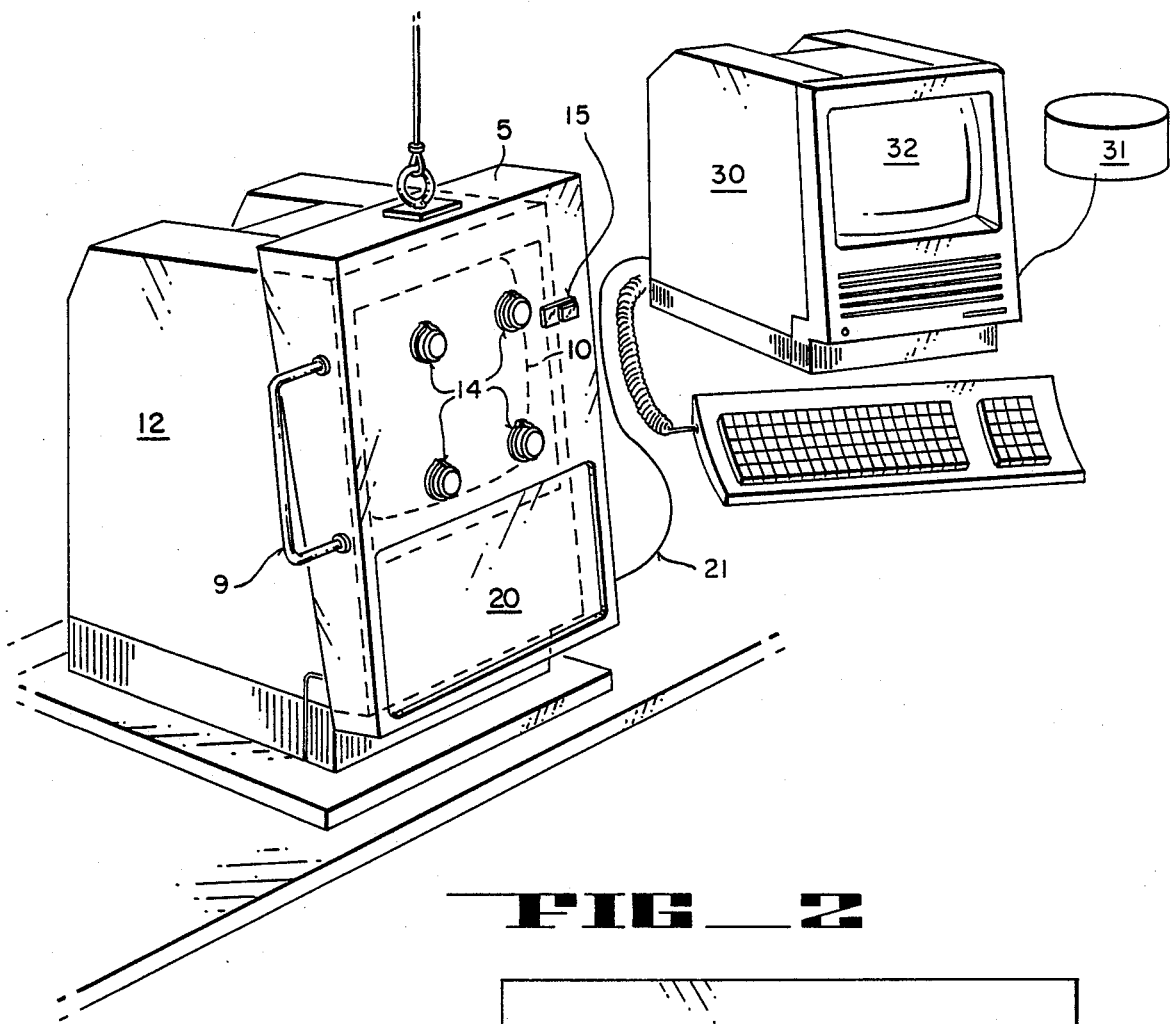
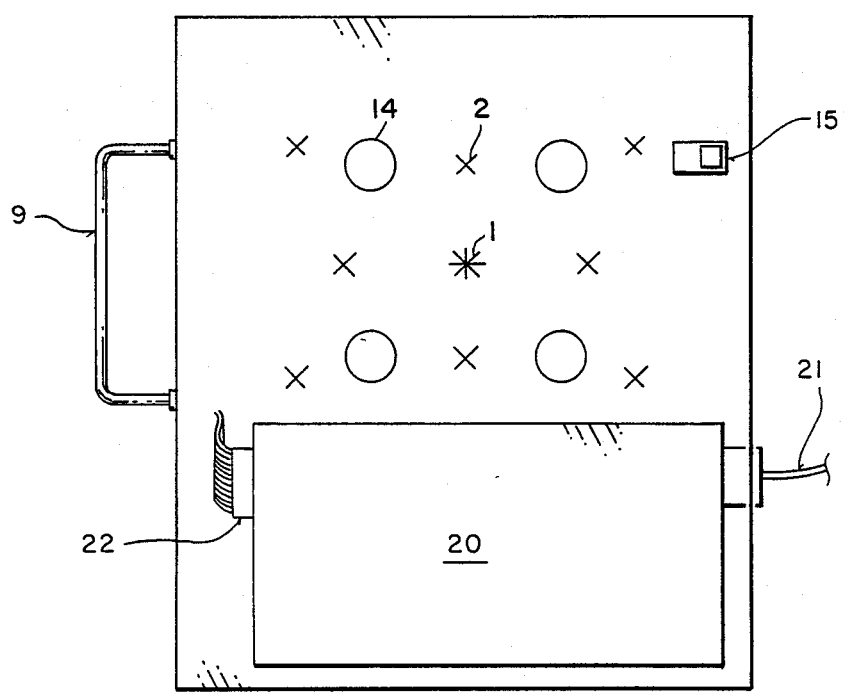

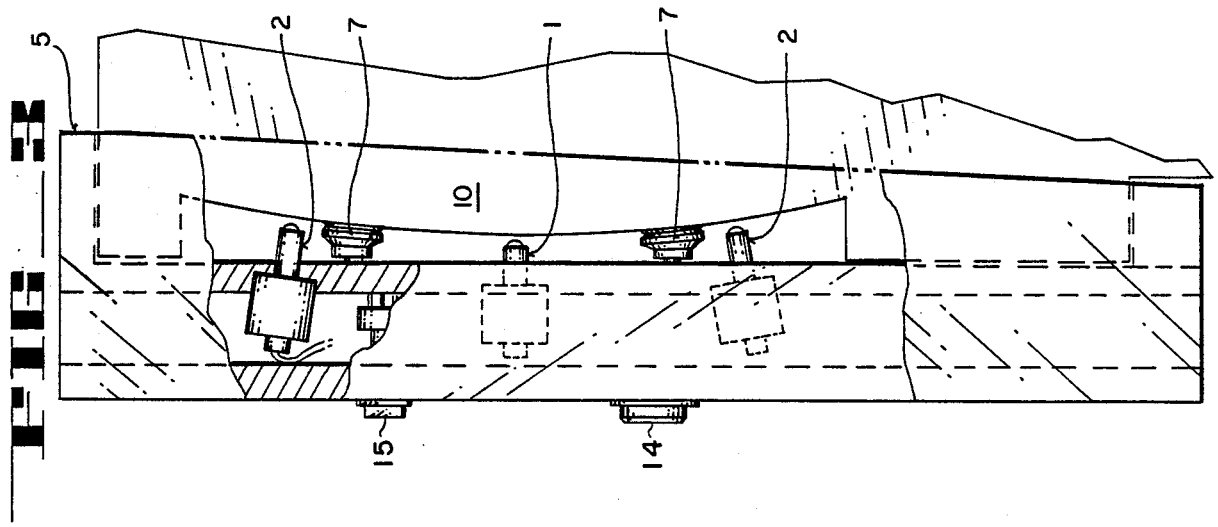
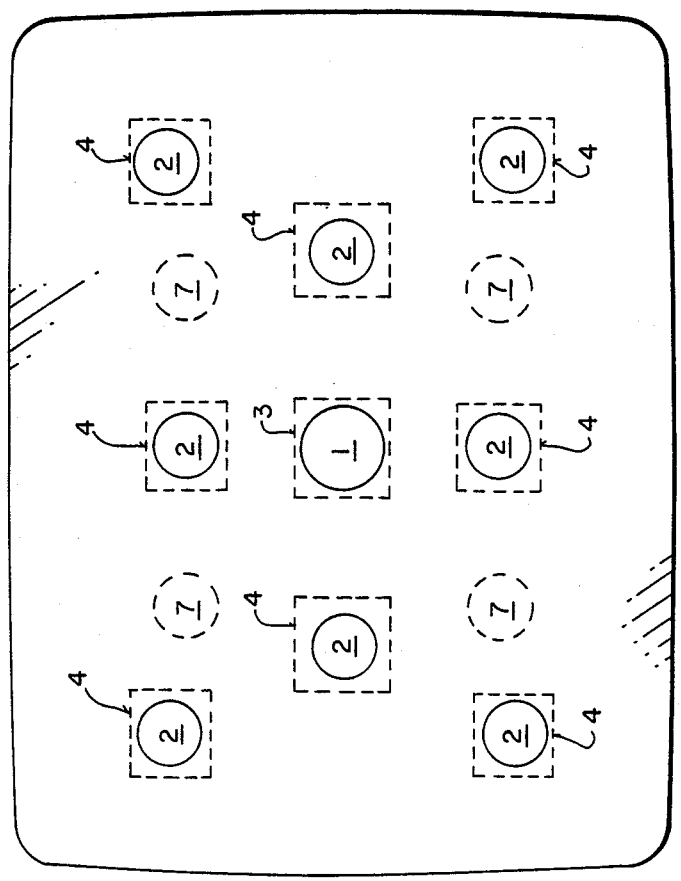

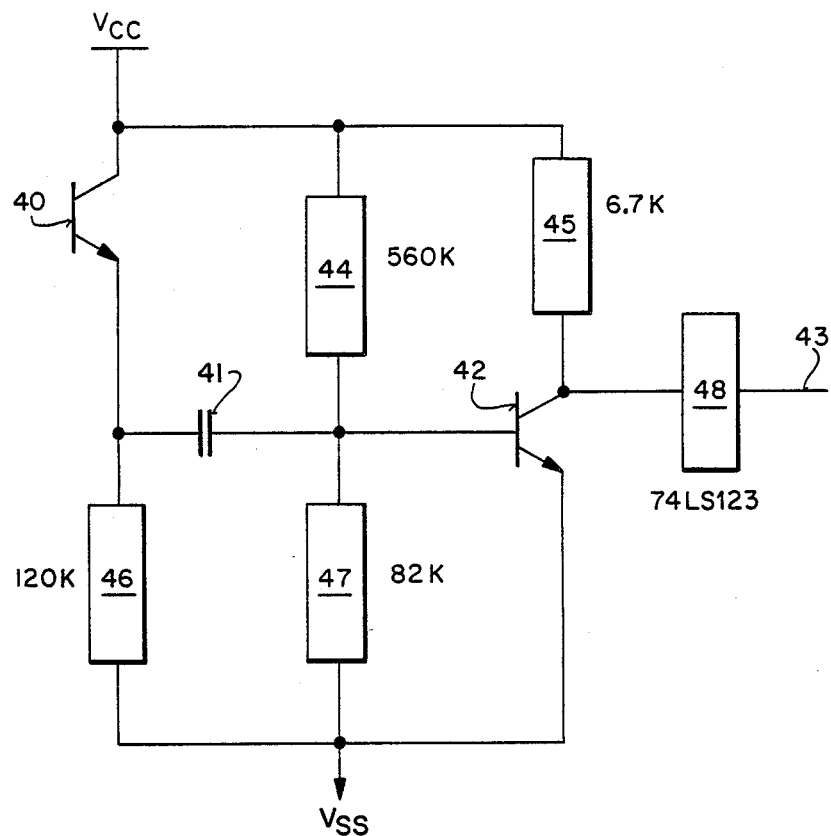
FIG_5
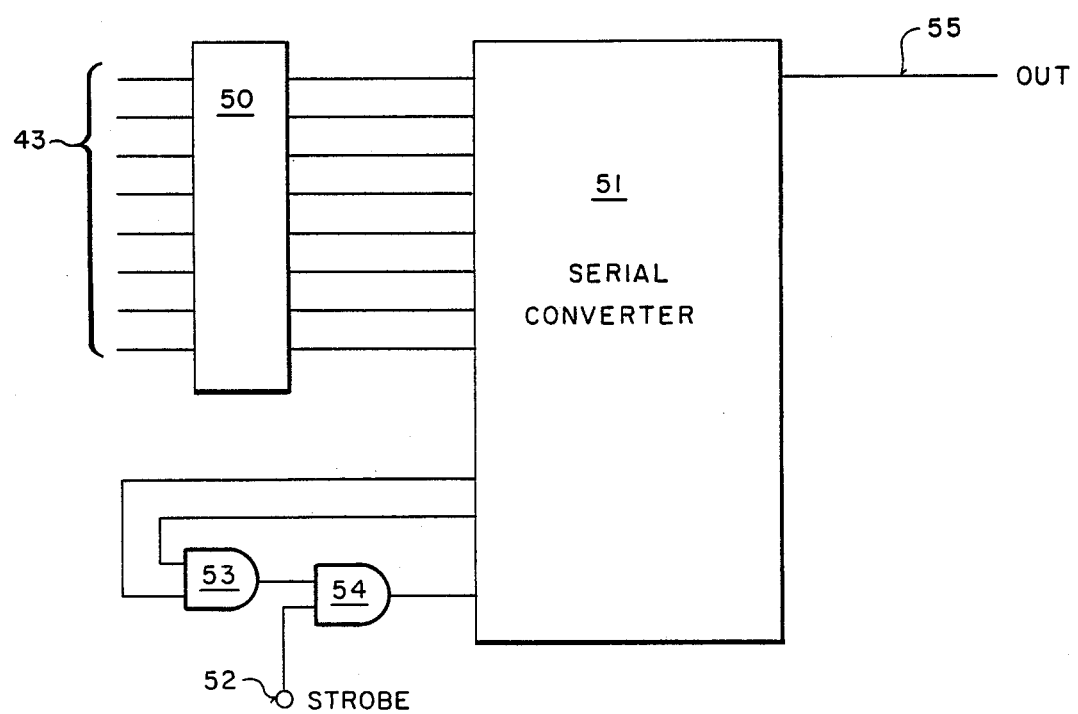
FIG_6

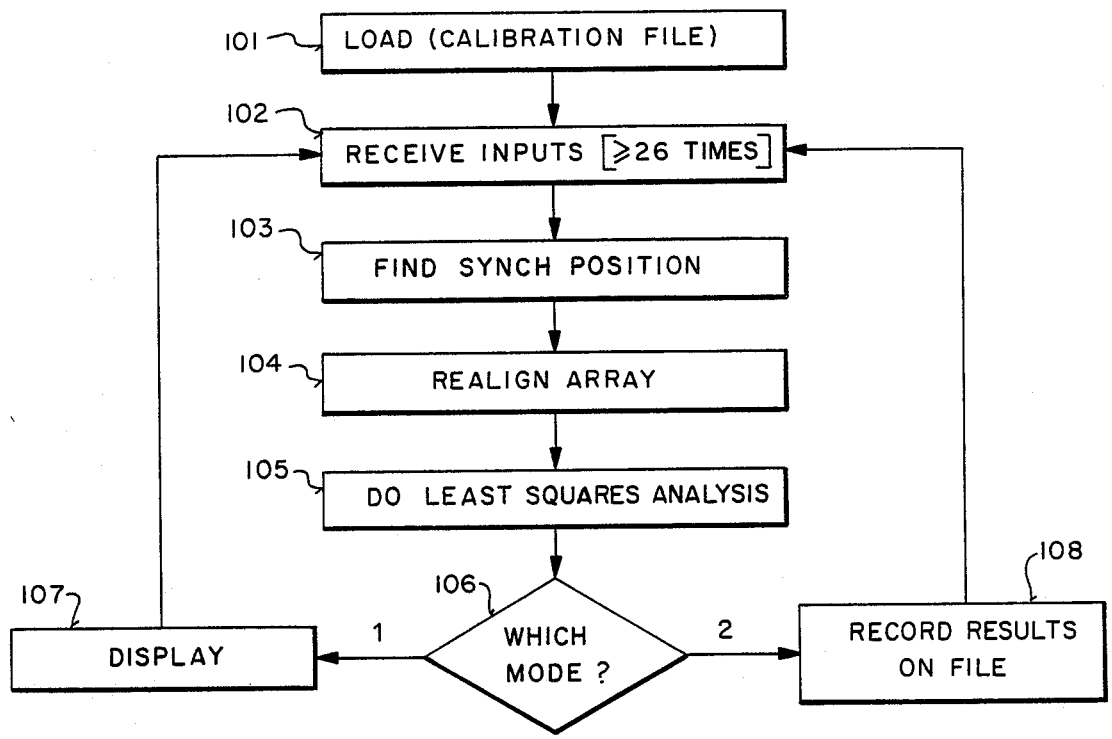
FIG_7

AUTOMATED TESTING APPARATUS FOR SCREEN ALIGNMENT

BACKGROUND OF THE INVENTION

1. Field of the Invention

The field of the invention is that of test equipment for screen alignment. More specifically an automated testing system for screen alignment.

2. Prior Art

Television cameras are used to detect screen distortion. Often it is the case that the number of pixels on the monitor to be tested is greater than that of a television camera. Because of that problem, multiple cameras must be used to test screen alignment. Also, more than one television camera must be used to resolve sensor problems caused by background noise. In order to get a system that checks each pixel on the screen, a number of sensor bits are used to determine the distortion of the screen.

Thus automated testing equipment for screen alignment must deal with a number of difficulties. One difficulty is that multiple television cameras are required, which both increases the amount of time necessary to test a screen and increases the expensive of the testing equipment. In addition, the results from prior art testing systems are often incomplete or unreliable, and the systems themselves are not user friendly.

What is needed is a apparatus for testing screen alignment that is both fast and reliable. One object of the present invention is to provide such an apparatus. Another aspect of the present invention is to provide a apparatus that tests for a number of possible distortion errors. A third aspect of the present invention is to provide for a system that can be easily utilized on the mass production of screen equipment.

SUMMARY OF THE INVENTION

The present invention is an apparatus and process for automated testing of screen alignment. Patterns are generated on the screen to be tested. A sensing device is mounted on the screen to be tested with circuitry for transmitting the test data to a computer. The computer runs programs that analyze the data and present results of the test to the user.

The sensing device comprises photo transistors that are mounted on the screen to be tested. Each photo transistor is carefully placed so as to be tangential to the plane perpendicular to the screen at the point at which it is placed. Each of these devices is placed at a different section of the screen. The screen then displays a series of patterns at preselected locations at or around the photo transistor sensors. By this method test alignment data is sampled.

After each sample is taken, a parallel-to-series convertor coordinates the transmission of the data samples to the analyzing computer.

Once the data samples are received by the computer the computer runs an analysis program. The analysis program has a pattern from a perfect screen available to it, and compares the perfect screen pattern against the sample data. The perfect data points are compared to the sample data points using the least sum of the squares method. By this calculation a number of different types of distortion may be detected.

The program then displays the data or it can store the data on a disk file. In addition, conclusions about screen distortion are presented. By this means the actual distortion parameters of each screen can be monitored quickly and efficiently on the production floor.

DESCRIPTION OF THE DRAWINGS

FIG. 1 is a perspective view of the screen alignment testing equipment of the present invention.

FIG. 2 is a front view of the sensor panel of the present invention.

FIG. 3 is a cross-sectional view of the sensing device of the present invention, mounted on a screen to be tested.

FIG. 4 is a schematic diagram of the location of the nine photo transistors of the preferred embodiment of the present invention.

FIG. 5 is a circuit diagram of the photo transistor sensing circuit of the present invention.

FIG. 6 is a schematic diagram of the parallel-to-serial transmitting circuit of the present invention.

FIG. 7 is a flow chart diagram of the analysis program of the present invention.

DETAILED DESCRIPTION OF THE INVENTION

The present invention describes an automated testing apparatus for screen alignment. In the following description numerous specific details are set forth, in order to provide a thorough understanding of the present invention. It will be obvious, however, to one skilled in the art that the present invention may be practiced without the specific details. In other instances, well known methods have not been described in detail so as not to unnecessarily obscure the present invention.

The preferred embodiment of the present invention is a testing apparatus for testing the monitors of Macintosh TM computers manufactured by Apple Computer, Inc., of Cupertino, California. The testing apparatus sends the data to another Macintosh computer which runs the analysis program. The analysis program is written in the computer language C. However, it will be obvious to one skilled in the art that the following description of an automated testing apparatus for screen alignment can be used to test any of a multiplicity of screen monitors or television sets. Also, any sort of general purpose computer can be used to receive data and run an analysis program as described. Furthermore, although the C programming language is used in the preferred embodiment, numerous other programming languages could be used to accomplish the same effect, such as FORTRAN, PASCAL, LISP, etc. The exact positioning of the sensors to the screen in the exact dimensions of the sensor plate must be tailored to the specifications of the screen being tested. However, the data transmitter and the receiving computer and analysis program need not be modified in order to practice the present invention on any of a number of different varieties of screens.

Referring to FIGS. 1 and 3, they show the configuration of the automated testing apparatus for screen alignment. Test screen 10 of computer 12 has sensor panel 5 mounted on it. The suction apparatuses 7 are positioned far enough apart to form a stable connection when the vacuum on/off switch 15 is switched on. The data output by sensor pins 2 and sensor pin 1, located in the sensor panel 5, are relayed by parallel-to-serial transmitter 20. Parallel-to-serial transmitter 20 then sends the data to computer 30 over serial communication line 21. The computer 30 runs the analysis program on the test data. The computer 30 can either display the results on display screen 32 or store the results on disk storage device 31. To position the sensor panel 5 on the test screen 10, handle 9 is used. Handle 9 projects from the left side of sensor panel 5. To start the alignment testing, on/off switch 15 is used to commence the vacuum action of the vacuum apparati 14, which affixes the sensor panel 5 to the test screen 10.

FIG. 4 shows the configuration of sensor pins 2 on test screen 10. There are eight sensor pins 2, in the preferred embodiment. A greater or smaller number of sensor pins may be used depending on the degrees of freedom desired in the analysis program. Also, there must be a sensor pin 1 for synchronizing the system. Although the sensor pin 1 need not be in any particular portion of the screen, in the preferred embodiment, it is placed in the center of the screen. The sensor pin 1 senses a timing signal displayed on the screen that helps to synchronize the data from the other sensor pins 2. In the preferred embodiment, sensor pin 1 and sensor pins 2 are photo transistors.

FIG. 3 is a cross-sectional view of the sensor panel 5 mounted on test screen 10. The sensor pins 2 are positioned so as to be perpendicular to the plane that is tangent to the screen at the location of sensor pin 2. Suction apparatuses 7 have angles of pivoting, so it is not necessary to exactly align each suction apparatus 7 so as to be perpendicular. Rather, when the sensor panel 5 is placed on the test screen 10, suction apparatuses 7 are close to the screen, and when the panel's switch 15 is turned on, the vacuum action affixes the suction apparatuses 7 to test screen 10, forming a vacuum seal.

Referring to FIG. 4, each sensor pin 2 is positioned in front of a scan box 4. The scan boxes 4 are areas of the screen to be tested. In these scan boxes 4, a series of images are displayed in order to generate observation signals from the sensor pins 2. The series of sensor pin outputs is examined by the analysis program to determine whether the screen is properly aligned. If the test screen 10 is a component of a computer system then the images in scan boxes 4 need only be programmed on that computer to be displayed in the appropriate sections of that screen. For testing screens that are not a part of a computer system, some type of display controller must be used to generate these images in scan boxes 4.

Again referring to FIG. 4, synchronization display box 3 is similar to scan boxes 4 in that it is also a portion of the screen that displays a certain pattern. Center pin 1 is positioned over the synchronization box 3. However, unlike the scan boxes 4, the synchronization box 3 repeats a timing pattern. At the beginning of every set of display sequences, the synchronization display box 3 will flash twice in a row causing center pin 1 to output two high or "on" signals. From that point, the synchronization box will cause center pin 1 to turn "on" only one out of every two cycles until the display pattern is over. By this means, the complete display set can be recognized as the set of data points between two "on" signals of the center pin and the next two "on" signals of the center pin.

The sensor panel in the preferred embodiment, is made of ultra-high molecular weight polyethylene. Because the screen to be tested, in the preferred embodiment, is a Macintosh, a small opening (not shown) is present on the bottom lid of the sensor panel to allow for reaching the brightness adjustment.

FIG. 5 shows the circuitry that sends signals from sensor pins 2. Closest to the screen, in the sensor pins 2, is a photo transistor 40. In the preferred embodiment, these photo transistors are BPY 62-2NPN photo transistors produced by Siemens. A capacitor 41 and, which in the preferred embodiment is a 0.01 uf capacitor is coupled to the emitter of photo transistor 40. Also coupled to the emitter of photo transistor 40 is resistor 46, which in the preferred embodiment is a 120 k ohm ($\Omega$) resistor. Resistor 46 is also coupled with the emitter of transistor 42. Capacitor 41 is also coupled with the base of transistor 42. The collector of photo transistor 40 is coupled to Vcc resistor 44 and resistor 45. Resistor 44, in the preferred embodiment, is a 560 k $\Omega$ resistor and is coupled in series with resistor 47, which in the preferred embodiment an 822 k $\Omega$ resistor. Resistor 47 is in turn coupled to the juncture of resistor 46 and the emitter of transistor 42, which is in turn coupled to Vss, which in the preferred embodiment is ground. The base of transistor 42 is also connected to the juncture of resistor 44 and resistor 47. Resistor 45, in the preferred embodiment, is a 6.7 k $\Omega$ resistor, which is in turn coupled to both the collector of transistor 42 and with dual retriggerable monostable multi-vibrator 48. The dual retriggerable monostable multi-vibrator 48 is coupled with output line 43. The aforementioned circuit is for taking the photo transistor signals, thresholding, and filtering the signals to provide a clean signal for digital output through output line 43. The dual retriggerable monostable multi-vibrator 48 is further used to convert the analog pulse to a digital signal, such as a TTL level signal, and hold the pulse for the duration of a screen retrace.

The circuitry of FIG. 5 thresholds and filters the photo transistor signals to provide a clean signal to the digital portion of testing apparatus. The resistor and capacitor values are carefully chosen to minimize ambient lighting effects as well as to provide a clean signal. The dual retriggerable monostable multi-vibrator converts the analog pulse to a digital signal, such as a TTL level signal, for the time necessary to have a new pattern displayed on the screen, which in the preferred embodiment is 17 ms. Each output line is comprised of a twisted pair of wires which minimize noise effects. The output lines are coupled to a connector on the the sensor plate is with. The sensor plate 5 is then coupled to the data transmitting circuit.

FIG. 6 shows the circuitry of the data transmitting circuit. Inputs from lines 43 are received by buffer 50. Buffer 50 latches when both the serial convertor and the external strobe are ready. AND gates 53 and 54 serve to provide a means to determine when both the external strobe and the serial convertor are ready. Two lines from serial convertor 51 are coupled as input to AND gate 53. When both lines are high, AND gate 53 produces a high signal which is then input into AND gate 54. The other input of AND gate 54 is external strobe 52. The strobe 52 is connected to the sensor pin 1 which provides the synchronization of the sensor pins 2. When AND gate 54 becomes high, serial convertor 51 accepts inputs from buffer 50. Then serial convertor 51 sends serially an output line 55, at a predetermined rate, the parallel data taken from buffer 50.

FIG. 7 shows a flow chart of the analysis program of the present invention. Step 101 is an initialization step where calibration data is initialized in the program. This calibration data can be loaded from a number of sources. In the preferred embodiment a separate disk file is used to hold the calibration data.

In step 102, the computer program receives inputs serially from the parallel to serial transmitting circuit described in FIGS. 5 and 6. In the preferred embodiment, there are 26 different patterns that are displayed in the scan boxes on the test screen. Therefore, to insure that a full sample of data is received, it is recommended that the program receive slightly more than 26 items of data. The next step, step 103 involves finding the synchronization position in the inputs. This involves finding the occurrence of two on signals sequentially occurring in the center pin field of the data. This is a signal that the data signal is beginning. At this point it can be determined where the beginning point of the data is. In step 104, the array of data items is realigned so that the data received immediately after the turn "on" pulse is in the first position with the rest of the data following sequentially.

The next step in the program does the numerical analysis, that is step 105. The analysis comprises solving the linear equation involving the transformation between the ideal calibration points that were initialized into the program at step 101 and the sample data points that were received as inputs in step 102. By solving the following equation, 2 x 2 (a b c d) matrix provides for parameters describing the stretch, rotation and skew of the test screen. The following equation is solved:

$$[xa' \; ya'] = [xa \; ya] \times \begin{vmatrix} a & b \\ c & d \end{vmatrix} + [xd \; yd]$$

Where [xa ya] is a calibration or ideal value that represents a coordinate pair drawn from the corresponding position in the [xa ya] array. The two terms [xd yd] are the X and Y displacements of the transformed point. The (a b c d) matrix is that which encodes a combination of stretch, rotation and skew in its four parameters. The [xa' ya'] are the resultant coordinates of the transformed point.

The next step in the analysis is to find the transformation that gets the [xa' ya'] closest to the distorted points [xb yb]. This is done by using the least squares fit method. The least sum of the squares method is an equation where the sum of the squares of the differences of all the points is minimized. In order to minimize this sum, the various a, b, c, d, xd, and yd values are changed until the smallest sum is arrived at.

It would be obvious, however, to one skilled in the art that any one of a number of mathematical methods of numerical analysis could be used. Various methods of curve fitting are well known in the art. The method required for step 105 comprises some equation or equations that can reconcile the sample data points with the ideal calibration points.

After completion of the numerical analysis, the program proceeds to step 106 which checks the current mode of the program. If the program is in mode 1, the results of the numerical analysis are displayed on the computer's screen at step 107. From 107 the program returns to step 102 to receive more inputs. If the mode is mode 2, then the program proceeds to step 108 where the results are recorded on a disk file. From step 108, program control then proceeds to step 102.

Although there is no provision for terminating the program in the flow chart of FIG. 5, in the preferred embodiment the program is run on a Macintosh computer. Using a pull down menu from the Macintosh computer, the execution of the program can be suspended or terminated. However, it will be obvious to one skilled in the art that any number of program termination methods can be used.

The photo transistors used in the preferred embodiment of the present invention were chosen for several reasons. One reason was that the type of photo transistor matched well with the spectral response curve of the phosphor type used on the test screen. Another reason was that the photo transistors had a high gain. A third reason was that the photo transistors had a narrow response angle of only 8 degrees.

The suction apparatus are designed to have an angle of pivoting. In this manner, the suction apparatus need not be as carefully positioned as the sensor pins. Also, a vacuum pump is connected to the suction apparatus and the on/off switch. The vacuum pump is calibrated such that the speed of affixing is fast, without risk of damaging the test screen. The suction apparatus is fabricated from aluminum with rubber suction cups for affixing to the screen. To prevent chafing and provide a strong inlay, the panel is heated so that it expands and the holes become larger than the suction apparatus. Then the apparatus are inserted, and the panel is left to cool.

The parallel-to-serial converter, in the preferred embodiment, is driven by a clock signal so that the baud rate of the serial transmission of data can be selected from a range of values. In the preferred embodiment, the baud rate is determined by a clock with switches, allowing the baud rate to be set between 50 and 192,050.

In the production line, the sensor panel itself is coupled to zero-gravity cables. In this manner the panel can be easily moved on and off test screens. In the preferred embodiment of the present invention, the panel is bent to compensate for the 5° angle of the screen in relation to the rest of the Macintosh. However, it would be possible to hang a totally flat panel on the zero-gravity cables at a 5° angle, so that the plane of the panel would always be parallel to the plane of the back of the screen. It is preferable to have a thinner panel, as shown in the present invention, for several reasons, including the greater ease of hanging such a panel given a simple center of gravity.

The first series of patterns, which occurs over the entire screen, is a type of binary search in the preferred embodiment. The binary search pattern comprises displaying on the first pattern half dark and half bright. In the second pattern of the series, the first quarter of the screen is bright and the next half of the screen is dark and the last quarter of the screen is bright. By having two data points from a sensor we can then determine in which of the four quadrants the sensor is positioned above. For the third level, the pattern is further divided as ⅛ bright followed by ¼ dark followed by ¼ bright followed by ¼ darkness followed by ⅛ of brightness. Similarly, the screen is further divided for the rest of the data sample. In the preferred embodiment, it takes only 6 iterations to uniquely determine one coordinate of the position of the sensor within 8 pixels. The same process is executed to determine the other coordinate. This yields the high order of the sensor's address.

Once the high order of the address is determined, the low order of the address is then determined by a different series of patterns. The second series of patterns need only occur in the scan boxes. The location of the scan boxes is determined by the high order of the address for each particular pixel. The second series of patterns for determining the precise location comprises a pattern of bars, each bar comprising 8 light or dark pixels. The 8 pixel wide pattern bars are moved 2 pixels at a time. This is done along both dimensions. In this manner the error of determining the exact location of the pixel is 0.5 pixels, and a maximum error of 1 pixel. Although the accuracy of the determination can be improved by moving the pattern in 1 pixel increments rather than 2, in the preferred embodiment, 2 was chosen to increase the speed of the testing.

Thus, to determine a vertical or horizontal coordinate, both the binary search pattern and the bar pattern are displayed. In the preferred embodiment, this calls for a total of 26 screen patterns comprising of 6 binary search patterns plus 7 bar patterns times the 2 coordinate dimensions being measured. However, different numbers of binary search patterns may be needed for different sized screens. It would be obvious to one skilled in the art, how to modify the display and analysis programs to work with different sized screens. Every time a new pattern is drawn on the screen, the synchronization display box is flashed black and then white. This flash drives the center pin and causes the new data on the photo transistors to be sent to the computer. Once per full cycle, the synchronization display box is held for twice as long as normal allowing the receiving program to identify the beginning of a new set of data.

The present invention can be adapted to test a variety of different screens. To adapt the preferred embodiment, the panel must be reshaped for the new screen and frame. The center pin is adjustable, so that it only need to be adjusted slightly to properly position the sensor pins. The display and analysis algorithms would need slight changes for a screen of different dimensions. Thus the present invention is easily adapted to a variety of screens.

Thus, an automated testing apparatus for screen alignment is described.

We claim:

1. An automated testing apparatus for screen alignment of a video display screen comprising:
    display generation means, coupled to a video screen to be tested, for generating predetermined patterns on said screen;
    sensing means, coupled to said screen, having a plurality of sensors prepositioned and fixedly mounted in a sensor plate for sensing said predetermined patterns on said screen;
    computing means, coupled to said sensing means, for receiving test data from said sensors and comparing said test data to data from an ideal screen such that the results of said comparison determine parameters for evaluating screen alignment and distortion.

2. The automated testing apparatus described in claim 1 wherein said display generation means includes a program running on a computer that is coupled to said screen.

3. The automated testing apparatus described in claim 1 wherein said display generation means is a video controller.

4. The automated testing apparatus described in claim 1 wherein said sensing means is further comprised of:
    synchronization means, coupled to said computing means, for sequencing the transmission of data; and
    photo sensing means, coupled to said computing means, for signaling the presence or absence of photo-emissions from said screen.

5. The automated testing apparatus described in claim 4 wherein said synchronization means is further comprised of:
    an analog-to digital converter;
    a threshold and filter circuit coupled to said photo sensing means and to said analog-to- digital converter, such that an analog photo-sensed signal is filtered for analog-to-digital conversion by said analog-to-digital converter.

6. The automated testing apparatus described in claim 5 wherein said photo sensing means is comprised of photo transistors.

7. The automated testing apparatus described in claim 6 wherein said computing means displays the results of said comparison on a second video screen.

8. The automated testing apparatus described in claim 7 wherein said computing means records and stores the results of said comparison in a storage device.

9. A method for testing alignment of a video display screen, comprising the steps of:
    positioning a plurality of photo sensors over said screen;
    generating a first predetermined pattern on said screen for detection by said sensors in order to locate higher order coordinates corresponding to locations of said sensors;
    generating a second predetermined pattern on said screen for detection by said sensors in order to locate lower order coordinates corresponding to locations of said sensors;
    analyzing sensed data produced by said sensors by comparing said sensed data to predefined values to determine screen alignment characteristics of said screen.

10. The method of claim 9 further comprising the step of displaying the results of said analyzing step, said displaying step occurring after said analyzing step.

11. The method of claim 10 wherein a timing pattern is displayed on a predetermined section of said screen, such that at least one of said sensors provides timing data.

12. The method of claim 11 wherein said step of analyzing is performed by using a least sum of the squares fit analysis technique.

13. The method of claim 12 wherein said displaying step is further comprised of graphically presenting the results of the analysis.

14. The method of claim 13 wherein said displaying step further comprises recording the results of the analysis in a memory.

15. An apparatus for testing screen alignment of a video display screen, comprising:
    display generation means coupled to said display screen for generating predetermined patterns on said screen:
    a sensor panel comprised of:
        (a) a plurality of vacuum suction devices for coupling said sensor panel over said screen; and
        (b) a plurality of sensor photo transistors for sensing at least a first and second patterns on said screen, wherein at least one of said plurality of photo transistors is used for sensing a timing sequence of said patterns;
    a threshold and filter circuit coupled to said sensor photo transistors, such that an analog photo sensed signal sensed by said transistors is filtered;

an analog-to digital converter coupled to said threshold and filter circuit for converting said analog photo sensed signal to a digital signal;
a processor coupled to said analog-to-digital converter and having a resident analysis program that compares test data received from said sensor panel to predetermine ideal screen alignment data to determine misalignment of said screen.

16. A method for testing alignment of a video display screen, comprising the steps of:
positioning a sensor plate comprising a plurality of fixedly mounted photo sensors over said screen;
generating a display using a series of predetermined patterns on said screen to be sensed by said sensors, wherein said predetermined patterns are comprised of a series of Gray code patterns for coarse positioning of said sensors and a series of pixels-wide bar patterns for fine positioning of said sensors;
analyzing outputs of said sensors by comparison to predefined ideal screen parameters to determine screen alignment characteristics of said screen.

17. The method of claim 16 wherein said predetermined patterns are sensed by said sensors which then indicate positions of said sensors relative to said predetermined patterns.

18. The method of claim 17 wherein said step of analyzing by comparison is performed using a least sum of the squares fit analysis technique.

* * * * *